（12）United States Patent
Speicher et al.

(10) Patent No.: US 8,069,260 B2
(45) Date of Patent: Nov. 29, 2011

(54) DYNAMIC BUFFER SETTINGS FOR MEDIA PLAYBACK

(75) Inventors: Ashley C. Speicher, Redmond, WA (US); Nicholas J. Fang, Redmond, WA (US); Todd Z. Bowra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1357 days.

(21) Appl. No.: 11/652,708

(22) Filed: Jan. 12, 2007

(65) Prior Publication Data

US 2008/0172441 A1 Jul. 17, 2008

(51) Int. Cl.
*G06F 15/16* (2006.01)

(52) U.S. Cl. ......... 709/231; 709/220; 381/386; 382/232

(58) Field of Classification Search ................ 709/231, 709/220; 381/386; 382/232
See application file for complete search history.

(56) References Cited

U.S. PATENT DOCUMENTS

| | | | |
|---|---|---|---|
| 5,761,692 A | 6/1998 | Ozden et al. | |
| 6,385,673 B1 | 5/2002 | DeMoney | |
| 6,684,273 B2 | 1/2004 | Boulandet et al. | |
| 6,757,292 B2 | 6/2004 | Pate et al. | |
| 6,795,581 B1 * | 9/2004 | Nomura | 382/232 |
| 6,993,604 B2 | 1/2006 | Dixon | |
| 2002/0046288 A1 | 4/2002 | Mantegna et al. | |
| 2002/0105951 A1 | 8/2002 | Hannuksela et al. | |
| 2003/0118321 A1 | 6/2003 | Sparrell et al. | |
| 2005/0132417 A1 | 6/2005 | Bobrovskiy et al. | |
| 2006/0077994 A1 | 4/2006 | Spindola et al. | |
| 2007/0058832 A1 * | 3/2007 | Hug et al. | 381/388 |
| 2007/0153651 A1 * | 7/2007 | Lin et al. | 369/47.32 |

OTHER PUBLICATIONS

Civanlar, Reha M., "Internet Video—Protocols & Applications", Date: 2001, http://www.ittc.ku.edu/~jgauch/cgi-bin/library/papers/Civanlar.2001.pdf#search=%22%22Internet%20Video%20-%20Protocols%20%26%20Applications%22%22.
Tu et al., "Adaptive Playback Buffer for Wireless Streaming Media", Date: 2004, http://anyserver.cityu.edu.hk/weijia/2004/ICON04.pdf#search=%22%22Adaptive%20playback%20buffer%20for-%20wireless%20streamina%20media%22%22.

* cited by examiner

*Primary Examiner* — Tammy Nguyen (57) ABSTRACT

Improved responsiveness and reduced latency of media playback on a media player is achieved by dynamic adjustment of storage parameters for the jitter buffer in the media player. Decreasing the size of the jitter buffer to a smaller constant value may provide acceptable, starvation-free playback in many cases. Playback of more demanding files requiring more buffered data for decode are addressed by dynamic adjustment of the jitter buffer parameters. An algorithmic or heuristic process is used to dynamically set the size of the jitter buffer before and during media playback. The jitter buffer size and/or preroll duration may be adjusted based upon the quality of playback experience. If playback starves, the jitter buffer size, starvation threshold, and/or preroll duration is increased before rebuffering and resuming playback. If the jitter buffer remains above a defined threshold for a given period of time, the jitter buffer size and/or preroll duration may be decreased, improving the responsiveness of startup and seek and trick mode operations.

11 Claims, 5 Drawing Sheets

DYNAMIC BUFFER SETTINGS FOR MEDIA PLAYBACK

BACKGROUND

Networked digital media players maintain a jitter buffer in order to smooth over network irregularities and ensure that their media decoders never starve. With some complex media formats, the media decoders may allocate up to 12 or more seconds of buffered data for some media files in order to guard against starvation. This jitter buffer "preroll" allocation is often set by the content creator as part of the decoding information in the media format. Buffering this quantity of data over the network before commencing playback increases playback latency dramatically and is thus not preferred from a consumer standpoint. Further, when performing a transport control operations, such as a seek command, the latency of the media player is compounded by the preroll allocation as well as the need to process (e.g., play or flush) any data remaining in the jitter buffer.

SUMMARY

Improved responsiveness and reduced latency of media playback on a media player may be achieved by dynamic adjustment of storage parameters for the jitter buffer in the media player. For an improved consumer experience, it may be possible to decrease the size of the jitter buffer to a smaller constant value. This may provide an acceptable, starvation-free experience in the majority of cases. However, playback of more demanding files, e.g., files requiring more buffered data for decode, may be better served by dynamic adjustment of the jitter buffer parameters. An algorithmic or heuristic process may be used to dynamically set the size of the network jitter buffer before and during media playback. In one implementation, predefined baseline jitter buffer sizes for various well-known types of content may be initially used. The jitter buffer size may then be adjusted based upon the quality of playback experience. For example, if playback starves, the jitter buffer size may be increased before rebuffering and resuming playback. Conversely, if the jitter buffer remains above a defined threshold for a given period of time, the jitter buffer size may be decreased, improving the responsiveness of startup and seek and trick mode operations.

In one implementation, an initial set of parameters may be used. Then, while playing the media stream, history data reflecting playback performance of the media stream relative to instantaneous jitter buffer characteristics may be gathered. The storage parameters of the jitter buffer may then be adjusted based upon the history data. The history data may be compiled in a statistical database to provide a look-up table of preferred jitter buffer storage parameters for particular media files, media formats, system configurations, or a combination thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

Figure 1:
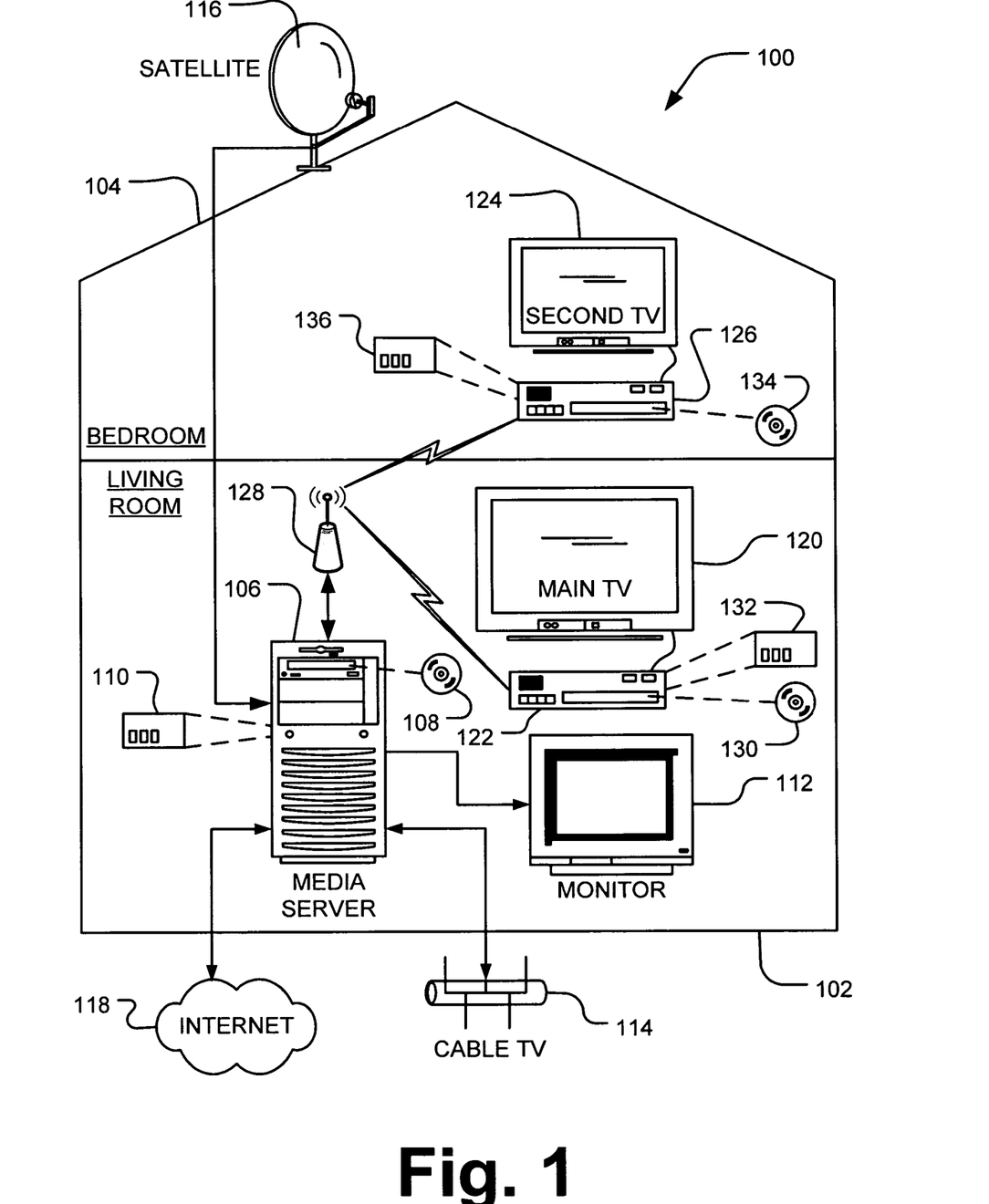
FIG. 1 is a schematic diagram of an exemplary home media system including a media player configured to dynamically adjust jitter buffer parameters to reduce playback latency while maintaining a high quality playback experience.

A media playback device with a media stream jitter buffer that may suffer from significant latency in response to default jitter buffer storage parameters may often be found in a networked media system 100 of the type depicted in FIG. 1. Exemplary dynamic adjustments to the jitter buffer storage parameters according to process implementations disclosed herein may significantly improve the responsiveness of such media systems while maintaining a high quality playback experience. An exemplary home media system 100 including a living room 102 and a bedroom 104 is shown in FIG. 1. Central to the media system 100 is a media server 106, in this implementation situated in the living room 102, but it could be located anywhere within the house. In one implementation, the media server 106 is a conventional personal computer (PC) configured to run a multimedia software package, for example, the Windows® XP Media Center Edition operating system (Microsoft Corporation, Redmond Wash.).

In such a configuration, the media server 106 is able to integrate full computing functionality with a complete home entertainment system into a single PC. For example, a user can watch television (TV) in one graphical window of a video monitor, while sending email or working on a spreadsheet in another graphical window on the same monitor. In addition, the media server 106 may also include other features or components, for example: a personal video recorder (PVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG).

Instead of a conventional PC, the media server 106 may comprise a variety of other devices capable of storing and distributing media content including, for example, a notebook or portable computer, a tablet PC, a handheld media player (e.g., an MP3 player), a smart phone device, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full-function computer running an operating system, the user may also have the option to run standard computer programs (e.g., word processing and spreadsheets), send and receive emails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability may be enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of contents. Alternately, the user may employ an SD tuner for SD content and an HD tuner for HD content separately.

The TV content may be received as an analog (i.e., radio frequency) signal or a digital signal (e.g., digital cable). The received TV and other media content may include discrete content packets, where each content packet includes actual TV content (i.e., audio and video data) and a policy or policies associated with the actual TV content. If TV content is received as an analog signal, discrete content packets may be created from the analog signal. In certain implementations, the content packets of received or created TV content may be compressed and/or encrypted for storage or transmission to devices within the media system 100. Encrypted content packets may be decrypted with keys transmitted to or resident at the devices.

The media system 100 may also include one or more network devices functioning as media players 122, 126 placed in communication with the media server 106 through a network 128, for example, a local area network (LAN). In an exemplary embodiment, the media players 122, 126 may be Media Center Extender devices, for example, an Xbox 360™ (Microsoft Corporation, Redmond, Wash.). The media players 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), a digital music player (e.g., MP3 player), or combinations thereof. Each of the media players 122, 126 may additionally have optical disc drives 130, 134, respectively, for compact disc (CD) or digital video disc (DVD) media playback. Each of the media players 122, 126 may also have memory drives 132, 136, respectively, to allow the media players 122, 126 to function as a DVR. Furthermore, the media players 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the media players 122, 126, and any other connected device through packet-based communication protocols, such as transmission control protocol (TCP), Internet protocol (IP), real-time transport protocol (RTP), and real-time transport control protocol (RTCP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the media system 100. These video display devices may be connected with the media server 106 via the network 128 either directly or via the media players 122, 126. As shown in the example of FIG. 1, the main TV 120 and the secondary TV may be coupled to the media players 122, 126 through conventional cables. The video monitor 112 may be coupled with the media server 106 directly via a video cable. The media server 106 and media players 122, 126 may also or alternatively be coupled with any of a variety of video and audio presentation devices. Media content including TV content may thus be supplied to each of the video display devices 112, 120, 124 over the home network 128 from the media server 106 situated in the living room 104.

The media players 122, 126 may be configured to receive streamed media content, including video and TV content, from the media server 106. Media content, and particularly video and TV content, may be transmitted from the media server 106 to the media players 122, 126 as streaming media comprised of discrete content packets via any of the network protocols described above. The streamed media content may comprise video IP, SD, and HD content, including video, audio, and image files, decoded on the networked media player devices 122, 126 for presentation on the connected TVs 120, 124. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard remote desktop protocol (RDP), graphics device interface (GDI), or hypertext markup language (HTML).

In addition to the media players 122, 126 and the video display devices 112, 120, 124, the media server 106 may be connected with other peripheral devices, including components such as digital video recorders (DVR), cable or satellite set-top boxes, speakers, and a printer (not shown for the sake of graphic clarity). The media server 106 and media players 122, 126 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
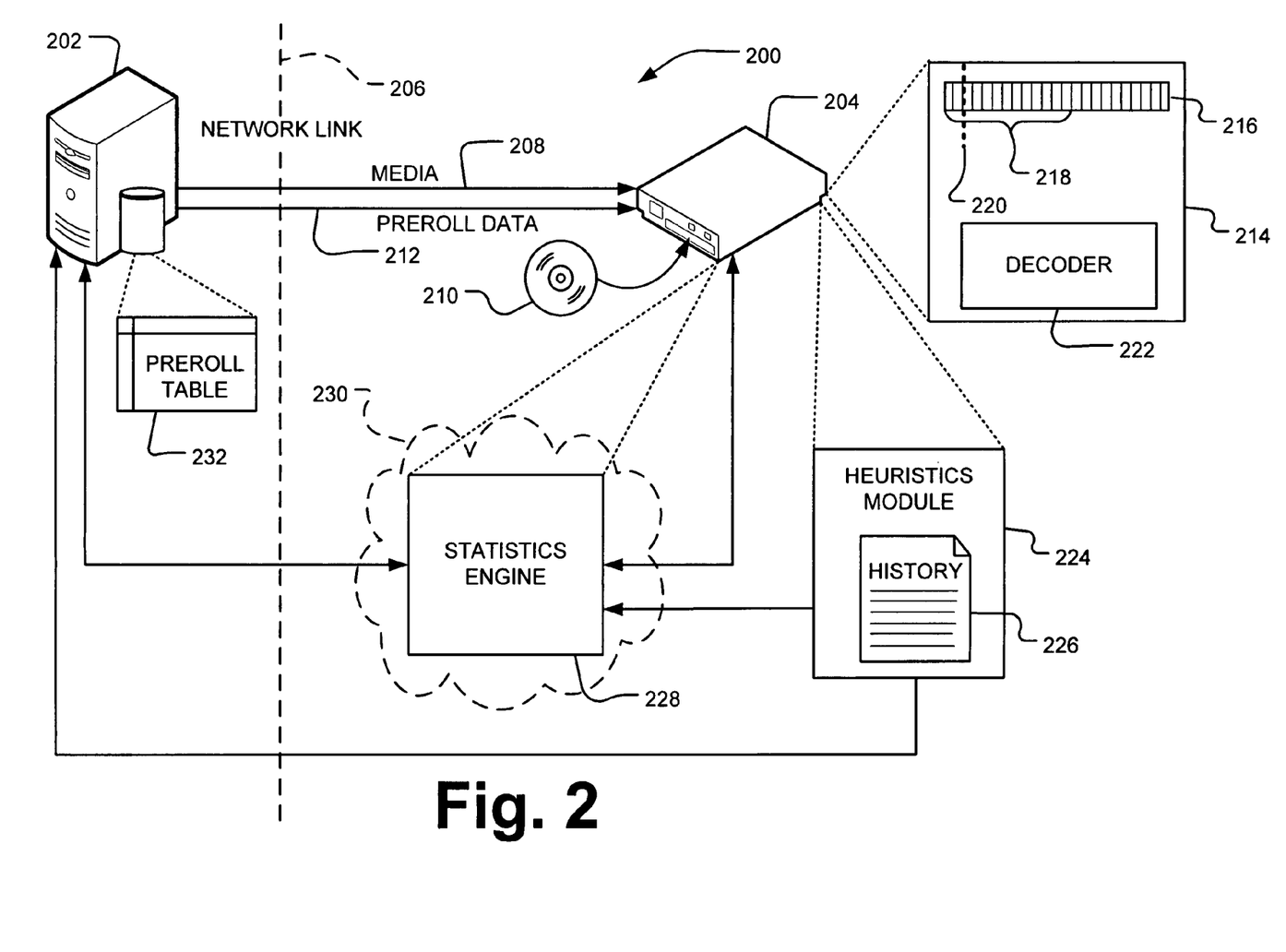
FIG. 2 is a schematic diagram of a networked media system that supports dynamically adjusting jitter buffer parameters and creating statistical compilations thereof.

FIG. 2 depicts an implementation of a media playback system 200 in which the amount of data buffered for playback is dynamically adjusted to minimize latency in the presentation while insuring that the data stream does not starve during playback. The media playback system 200 may include a media server 202 connected with a media player 204 over a network link 206. The media server 202 may act as a repository of multiple types of media available for playback on an appropriately configured media player 204. For example, the media server 202 may store a variety of movies or other prerecorded programming and a catalog of music selections. The media server 202 may further operate as a tuner for receiving and processing live broadcast media, for example, television broadcast over the air or via cable or satellite.

A particular media selection requested by a consumer for playback at a particular media player 204 may be transmitted from the media server 202 as a media transmission 208 over network link 206 to the media player 204. Alternatively, the media player 204 may play back local media 210, for example, a DVD, CD, or other digital media source read from either an internal or external drive attached to the media player 204.

A commonality between the media playback of the media transmission 208 and the local media 210 on the media player 204 is that both media sources may be subject to a period of latency between when playback is requested and when actual playback begins. With respect to a media transmission 208, the latency may be in part attributable to the data processing rate of the media server 202, the data transfer rate, or available bandwidth of the network link 206. With respect to the local media 210, latency may be a product of the data transfer rate of the drive or other media reader in the media player 204.

With respect to both the media transmission 208 and local media 210, latency may further be a result of the type of the media source. For example, HD-DVD or Blu-ray discs contain significantly more data than a comparable DVD and may thus require a higher bit rate to transfer enough information to resolve the same image which a lesser resolution DVD may provide more quickly at the same or lower bit rate. Another consideration that may lead to latency is the format of the data. For example, media stored in Windows Media Video (WMV) format may have periods of very high bit rate due to a large volume of key frames in close succession (e.g., during an action scene while the image is rapidly changing). Such high bit rate sections often manifest as spikes in what would normally be a much lower bit rate transmission. In comparison, the bit rate of an MPEG-2 format video is generally very constant throughout the entire length of the media. These factors of latency and varying bit rate together impact the ability of the media player 204 to consistently process media delivered for output to a presentation device.

The media player 204 may have playback engine 214 that includes a jitter buffer 216 and a decoder 222. The jitter buffer 214 and the decoder 222 may cooperate to address the issues of data latency and bit rate variance. The purpose of the decoder 222 is to convert the data from the media transmission 208 or local media 210 into a visible form for output to the user. Based on the media format being decoded, a certain amount of data in the media transmission 208 or local media 210 will convert into a certain amount of video output. Consistent video output is dependent on the decoder 222 receiving sufficient data from the media transmission 208 or local media 210. Failure to do so will cause the decoder 222 to starve (also referred to as "data starvation"), which results in a visible disruption to the media output. Starvation causes playback of the media by the media player 204 to stop until enough incoming data is stored to reach a preroll duration 218. At that point playback of the media by the media player 204 will be resumed. The result then of a starvation effect is an interruption in the playback of the media.

The jitter buffer 216 receives the digital media data stream via the media transmission 208 across the network link 206, or from the reading of local media 210 before the media stream data is fed to the decoder 222, and acts to ensure that the decoder 222 does not starve by maintaining a consistent flow of data to the decoder 222. Media data received at the media player 204 enters the jitter buffer 216 in the playback engine 214 and is processed by the decoder 222 in a first-in, first-out basis. The jitter buffer 216 may be of a sufficient size to store enough data to provide seamless decoding and playback of the media content without any glitches, pauses, or other interruptions, including those caused by data starvation.

The configuration of the jitter buffer 216 may be controlled by one or more storage parameters. For example, a portion of the jitter buffer 216 may be designated as a minimum preroll duration value 218. The preroll duration value 218 is a storage parameter that may be considered the minimum amount of data from the media transmission 208 or the local media 210 that must be stored in the jitter buffer 216 before the jitter buffer 216 will output data to the decoder 222 for processing and rendering for playback. By requiring a minimum preroll duration 218, the playback engine 214 is provided a tool to ensure that there is adequate media data in the jitter buffer 216 at the beginning of playback to prevent starvation of data and a pause in the playback of any media files.

The preroll duration 218 is generally a preset value, but it may be changed. Some digital media include a preset preroll value that is recognized by any standard playback device, for example, a media player 204. The media player 204 may by default select a preroll value transmitted with the particular media file to set the preroll duration 218 in the jitter buffer 216. As previously noted, such preroll duration values as set by content creators based on the media source or form may be significantly longer then necessary based upon the network and other conditions of the media playback system 200. If the preroll limit 218 is set too high, significant unnecessary latency between the input request for playback and the actual start of playback of the media may occur, thus degrading the quality of the playback experience for the user.

Through the implementation of the technology disclosed herein, the preroll duration 218 or other storage parameters may be dynamically modified in order to reduce latency of initial playback while ensuring a high quality playback experience and further reduce any latency that may occur upon execution of skip or seek functions. Information for resetting the preroll duration 218 may come from a variety of different sources. In one implementation the media player 204 may be programmed to reset the preroll duration value 218 to baseline values for different types of defined content, e.g., two seconds for audio, three seconds for video, and four seconds for high definition or high bit-rate video. In another implementation either or both of the preroll duration 218 and a maximum size of the jitter buffer 216, and/or other storage parameters, may be dynamically adjusted during the course of media playback. Note the total size of the jitter buffer 216 may be similarly present with different sizes for different defined types of content. In this way excess memory in the jitter buffer 216 may be freed up for other processing purposes of the media player 204.

The media player 204 may further include a heuristics module 224 that monitors the data storage state of the jitter buffer 216, particularly a starvation limit during playback of a particular media file. The starvation limit is the minimum amount of data that must be stored in the jitter buffer 216 in order to prevent play-out of all the data in the jitter buffer 216 to the decoder 222 before enough incoming data is available to formulate the next media segment, e.g., in video, one or a series of related video frames. It should be noted that the starvation limit may vary with respect to different media formats, network bandwidth, or other issues affecting data transfer bit rate. In order to avoid reaching the starvation limit, a starvation threshold 220 may be set at a point above the storage level in the jitter buffer 216 at which starvation is likely to occur based upon known factors, e.g., media format, decoder speed, network bandwidth, or prior encounters with a starvation limit. If the starvation threshold 220 is approached or reached, the heuristics module 224 may take steps to counter starvation from occurring, for example, increasing the capacity of or amount of incoming data stored within the jitter buffer 216.

The starvation threshold 220 may further be varied within the playback of a media file depending upon the file format and fluctuations in the amount of data required to output a media segment. For example, as discussed above with respect to a WMV file, an action scene may cause a lengthy sequence of key frames that comprise significantly more data to decode to render a media segment than more static scenes in the media program.

The heuristics module 224 may dynamically relocate the position of the starvation threshold 220 and alter the maximum allocation of memory to the jitter buffer 216 to track closely with the starvation threshold 220. The heuristics module 224 may also alter the preroll duration 218 of the media stream. If playback starves, the preroll duration 218 and also possibly the total size of the jitter buffer 216 may be increased by the heuristics module 224 before rebuffering and resuming playback. Conversely, if the jitter buffer 216 remains above a defined threshold for a given period of time, the jitter buffer 216 may be decreased in size and/or the preroll duration 218 may be decreased, thus improving the responsiveness of transport control operations such as forward or backward seeks.

Additionally, the heuristics module 224 may alter the size of the jitter buffer 216 or preroll duration 218 based upon knowledge of the media type and intended playback experience. For example, in the case of playlist-based music playback in which seek operations are unlikely, the size of jitter buffer 216 may be increased starting with the second file in the play list. Buffering of the second file may be initiated while the first file completes playback. An initially small jitter buffer 216 reduces start-up time for playback of the first file. Then, by prefilling the jitter buffer 216 with data from the second song, potential latency between shifts from the first song file to the second song and any further song files may be diminished despite the larger jitter buffer 216 size because the later song files begin to fill the jitter buffer 216 before the previous song file completes playing out and are available for immediate decode.

In addition to dynamically modifying the size of the jitter buffer 216 or the preroll duration 218, the heuristics module 224 may log a history data file 226 of instantaneous jitter buffer characteristics during playback of a particular media file. The history data 226 may reflect a correlation between the jitter buffer 216 characteristics and the playback performance of the media stream. Examples of types of data storage states that may be logged in the history data file 226 may include jitter buffer fullness over time; starvation events; whether starvation was due to lack of data; whether starvation was due to difficulty in file decode; or other statistical information. Additionally, configuration information including media source type, bit rate, media format, specific media file, and media playback device may be collected as part of the history data 226. The history data file 226 may be used by the media player 204 to select preroll duration 218 and the size of the jitter buffer 216 for future playback of this particular media file or similar media files in terms of content or format.

Additionally, this history data 226 may be transmitted over the network link 206 from the media player 204 to the media server 202 for storage on the media server 202. For example, the media server 202 may develop a preroll table 232 in which initial preroll duration settings for each of the media files stored on the media server 202 may be stored, overriding the default values specified in the media content with preroll duration 218 values to ones that are heuristically determined to provide a better playback experience. When media content is transmitted from the media server 202 to the media player 204 for playback, in addition to the media transmission 208, a preroll data transmission 212 may similarly be provided to the media player 204 with the recommended preroll duration 218 for that particular media file based upon its history of prior playback on the particular media playback system 200.

Further, in another implementation, the history data 226 may be provided to a statistics engine 228. The statistics engine 228 may be a part of the media playback system 200, for example, as a module on the media player 204, or similarly as a module on the media server 202 (not shown). Alternatively, the statistics engine 228 may be located external to the media playback system 200 and be accessible via an external network 230, for example, the Internet. The statistics engine 228 may compile history data 226 for playback of numerous media files on the media playback system 200 or, if operating from an external network location 230, the statistics engine 228 may collect history data from a large number of separate media playback systems.

The statistics engine 228 may use such history data 226 to develop an inventory of global statistics for optimal jitter buffer settings for playback of particular media files on a variety of media playback system configurations. For example, optimal settings for media file X on system A may be different than optimal settings for media file X on system B, which has a less capable decoder.

The statistics engine 228 may be connected with either or both of the media server 202 or the media player 204 in a particular media playback system 200 to provide such jitter buffer setting and preroll duration 218 information. In one implementation, the information from the statistics engine 228 may be used to fill the preroll table 232 at the media server 202. It should be noted that the media player 204 may similarly include a preroll table within the playback engine 214. In another implementation, the media server 202 or media player 204 may poll the statistics engine 228 over the network 230 to request specific jitter buffer 216 or preroll duration 218 parameters for a particular media file that has been selected for playback In yet another implementation, a content creator or media manufacturer may access information from the statistics engine 228 to provide a table of default preroll duration values to include on a media file that are optimal for various system configurations. As a corollary to this implementation, a content creator may even experiment with multiple media playback system configurations in order to develop optimal preroll duration settings before releasing the media for sale or use. In another implementation, such jitter buffer setting information developed by the statistics engine 228 through experimentation may be preloaded into the memory of playback devices such as the media player 204 before the product is shipped for sale to customers.

Figure 3:
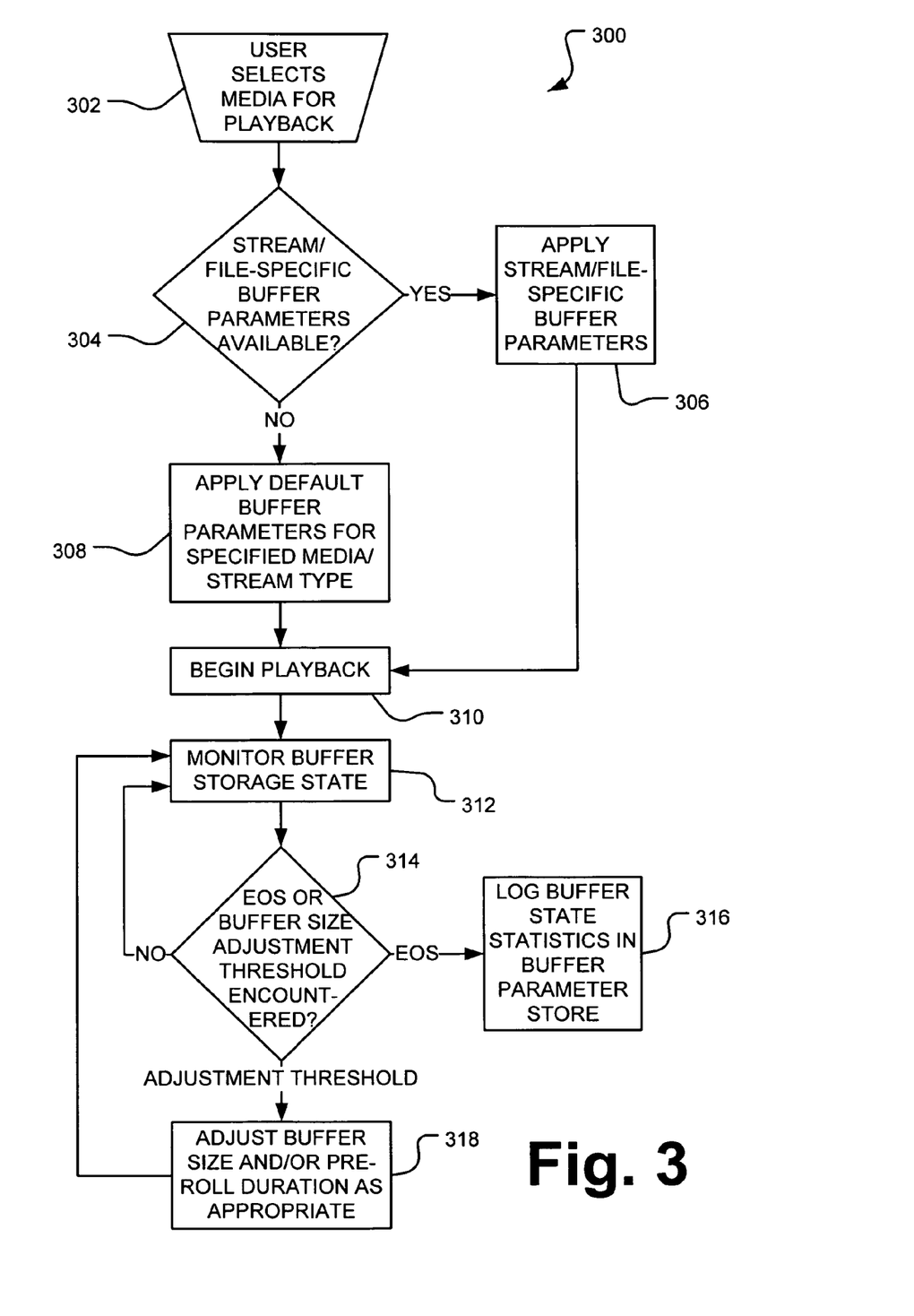
FIG. 3 is a flow diagram of an exemplary implementation of dynamic control of jitter buffer parameters in a media playback device.

FIG. 3 depicts an exemplary implementation of a heuristics program 300 for monitoring and dynamically adjusting the jitter buffer settings of a media player. Initially, in a selection operation 302, the user may select media for playback on the media player. As discussed above, the media may be transmitted from storage on a media server to the media player or it may be sourced from local media on the media player, for example, a DVD or CD. Again the issue of concern regardless of the media source is that playback latency is introduced due to the transmission, processing, or both, of the media file. Thus, a stream of media data will be placed in a first-in, first-out jitter buffer in order to ensure seamless playback. Before beginning to fill the jitter buffer however, the program 300 performs a first query operation 304 to determine whether there are any stream-specific or file-specific jitter buffer parameters available. These jitter buffer settings or parameters may be available, for example, in local memory in a jitter buffer history file, a preroll table stored on a media server or at the media player, or from a statistics engine, again available either locally or reachable via external network.

If it is determined that jitter buffer parameters are available, an application operation 306 applies such stream-specific or file-specific jitter buffer parameters to the jitter buffer of the media player. If stream-specific or file-specific jitter buffer parameters are not found in the query operation 304, an alternate application operation 308 will apply any default parameters available. Again these default parameters may be found as part of the data of the media file itself or the parameters may be a preset default of the media player device depending upon the media type, for example, whether the media is audio, video, or high definition or high bit rate video. Once the jitter buffer parameters have been applied in either operation 306 or operation 308, buffering, decoding, and playback of the media begins in a playback operation 310.

During playback, in a monitoring operation 312 the data storage state of the jitter buffer may be monitored for fullness. During the monitoring process, statistics aggregating preroll values and starvation limits among others may be recorded. Additionally, as part of the monitoring operation 312, a second query 314 may be performed to determine whether an end of stream event is reached or a jitter buffer size adjustment threshold is encountered. If the end of stream is reached, this indicates that the media file has fully completed playback. Note that alternatively an end of stream event could also indicate that there is a problem with the media server, the network, or the drive playing the local media source. Once the end of the stream is reached, the history log of jitter buffer statistics may be stored in memory in a logging operation 316 as part of the jitter buffer parameter store. This jitter buffer state information may be a valuable source of information for use by the application operation 306 when applying stream-specific or file-specific jitter buffer parameters.

Returning to query operation 314, if an adjustment threshold is encountered, the program 300 may adjust the jitter buffer size and/or the preroll duration as appropriate in an adjustment operation 318. An adjustment threshold may be any one of several events that may occur during playback of the media These events may include seek events or starvation events. Exemplary adjustment threshold events are described in greater detail herein with respect to FIG. 4. Similarly, in adjustment operation 318, the jitter buffer size and preroll duration may be increased or decreased based upon the circumstance. An exemplary process for determining appropriate increases or decreases to the jitter buffer size or preroll duration are also described in greater detail with respect to FIG. 4 herein. Once the adjustment operation 318 is completed, the process 300 returns to monitoring operation 312, which continues to monitor the playback of the media until the end of the stream is reached. Finally returning to the query operation 314, if no end of stream or adjustment threshold event is encountered in any particular cycle, the process 300 again returns to the monitoring operation 312 for the duration of the playback of the media.

Figure 4:
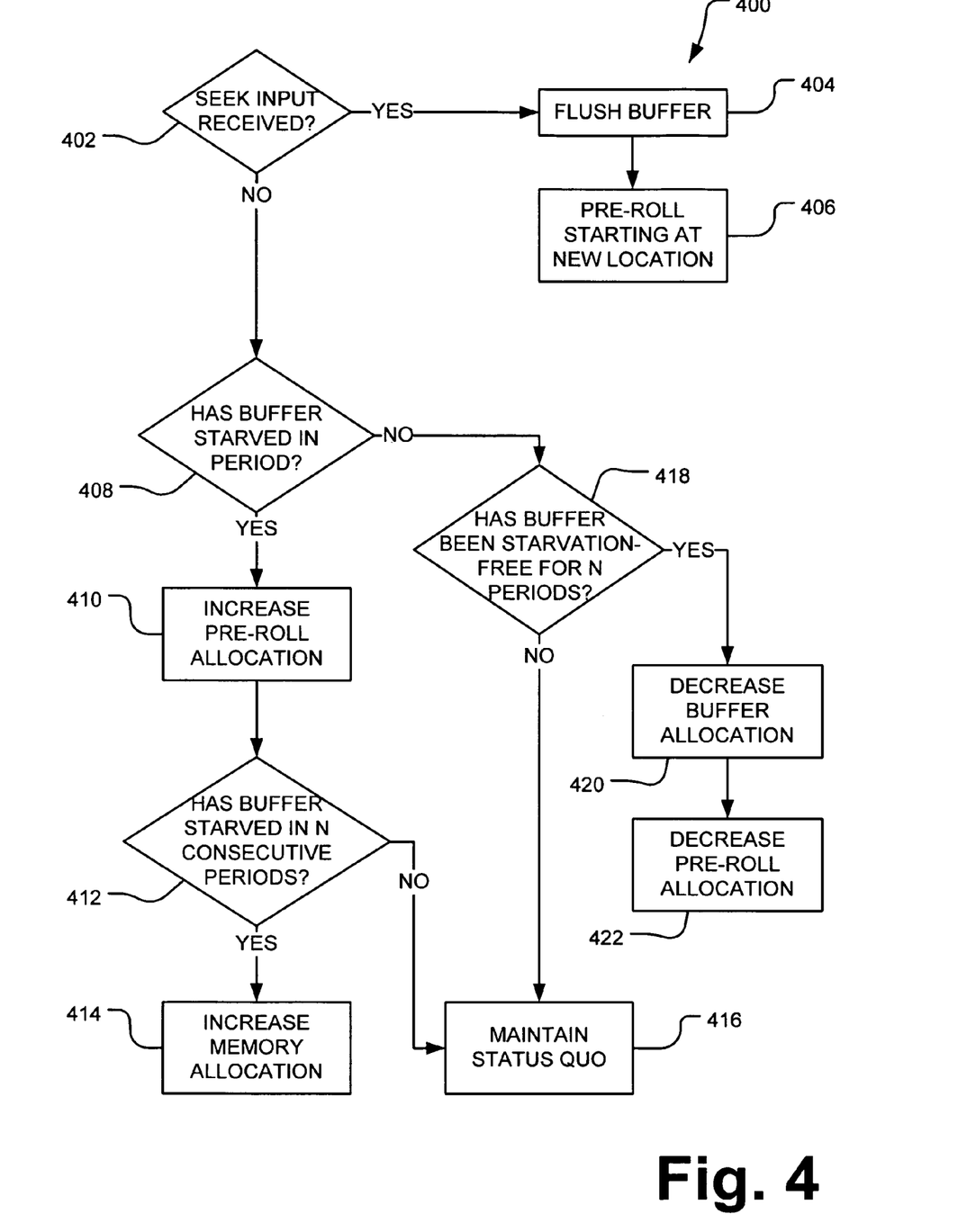
FIG. 4 is a flow diagram of exemplary adjustment thresholds and related adjustments to jitter buffer parameters in a media playback device.

As indicated above FIG. 4 depicts an exemplary jitter buffer adjustment process 400 for determining whether changes should be made to the jitter buffer size or preroll duration on encountering an adjustment threshold event. One example occurrence that may trigger an adjustment threshold may be the receipt of a skip or seek input command from the user. In a seek command, the user typically wants to navigate through the media playback to a prior or future point in the media file. Thus the adjustment threshold query of FIG. 3 may include an input query 402 to determine whether a seek input command was received. If a seek input is received, the jitter buffer may be flushed in flushing operation 404 before the jitter buffer starts filling with data from the new playback start location to fill the preroll duration. It may be desirable to flush the jitter buffer in flushing operation 404 in order to reduce the latency between receipt of the skip input command and playback of the media from the new starting location. By flushing the jitter buffer, the data previously stored in the jitter buffer will not be played out in advance of the data from the new starting location, thus reducing the potential delay in playback from the new starting location once the preroll duration is filled.

Another adjustment threshold event may be premised on the decoder starving or on the jitter buffer reaching the starvation threshold. Therefore, in addition to monitoring for seek input, the process 400 may track whether the jitter buffer starves during a discrete period of time as indicated in query operation 408. If it is found that the jitter buffer did starve in a previous period, the process 400 may increase the preroll allocation in a preroll increasing operation 410. The process 400 may further determine in query operation 412 whether the jitter buffer has starved in any number of consecutive periods. If so, this may indicate that the total jitter buffer memory allocation is insufficient to allow enough data to fill the jitter buffer to maintain seamless playback of the media file. In this situation, it may be appropriate to increase the total jitter buffer allocation in a memory increasing operation 414. Alternatively, if there is no consecutive period of starvation in the jitter buffer, the process 400 may merely maintain the status quo with respect to preroll duration in maintaining operation 416 for another monitoring cycle.

Returning to the starvation query indicated in query operation 408, if it is determined that the jitter buffer has not starved in the immediately proceeding period, then a further starvation query operation 418 may determine whether the jitter buffer has been starvation free for a number of periods in succession. If the jitter buffer has had a starvation event within the window of multiple periods, it may be appropriate to merely maintain the status quo in maintaining operation 416 with respect to jitter buffer size and preroll allocation and continue to monitor for further adjustment threshold events during playback that may later indicate a need for further adjustment. If the jitter buffer has been starvation free for a number of periods, it may be appropriate to decrease the jitter buffer allocation in decreasing operation 420 and/or decrease the preroll allocation in decreasing operation 422 in order to free up jitter buffer memory and improve the latency period for any start-up event.

Figure 5:
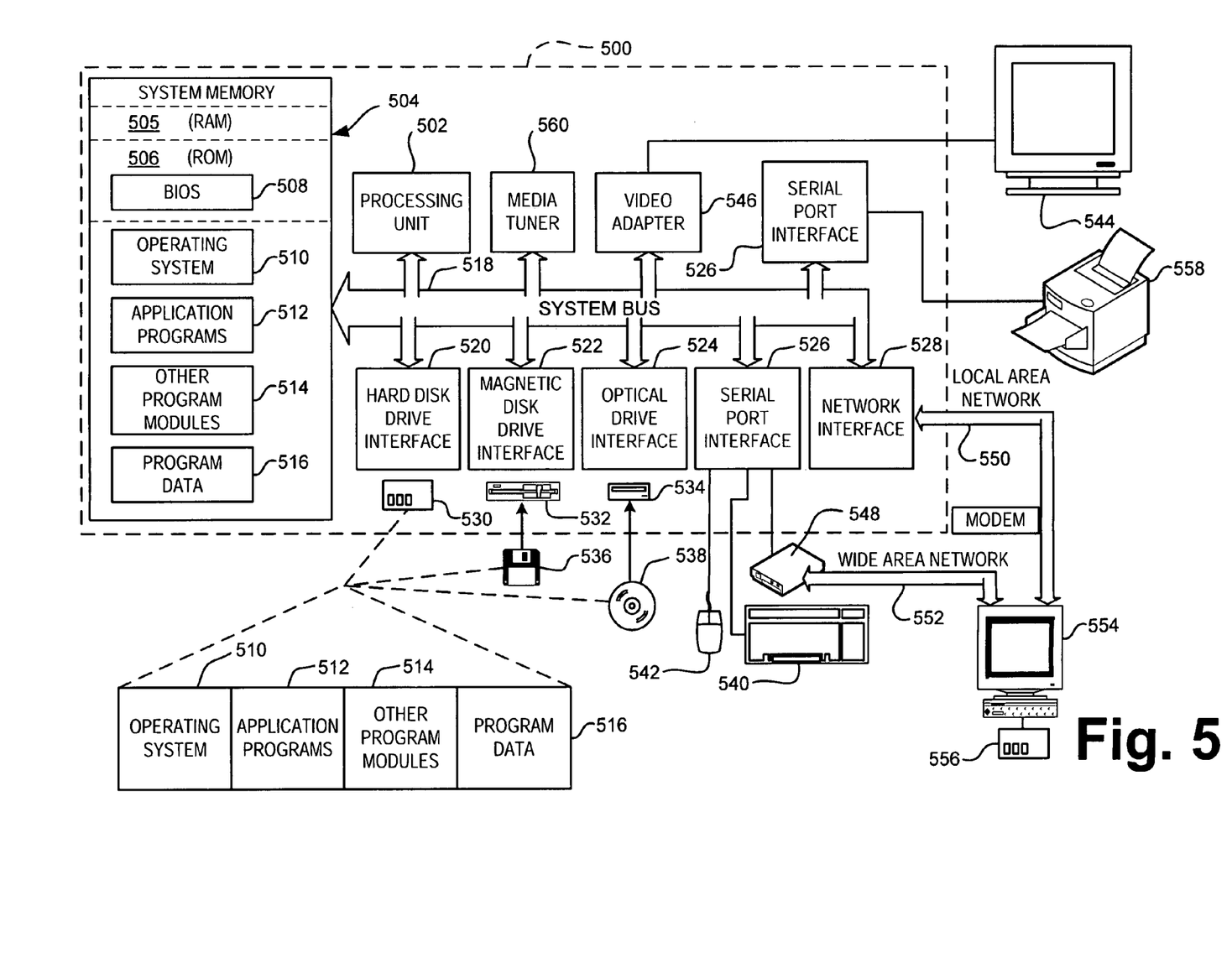
FIG. 5 is a schematic diagram of an exemplary general purpose computing system that may take the form of one or more of the devices in an implementation of a media system herein.

An exemplary hardware and operating environment for a media server, media player, or other device contemplated in implementing the jitter buffer configurations is depicted in FIG. 5. The environment includes a general purpose computing device in the form of a computer 500, including a processing unit 502, a system memory 504, and a system bus 518 that operatively couples various system components, including the system memory 504 to the processing unit 502. There may be only one or there may be more than one processing unit 502, such that the processor of computer 500 comprises a single central processing unit (CPU), or a plurality of processing units, commonly referred to as a parallel processing environment. The computer 500 may be a conventional computer, a distributed computer, or any other type of computer; the invention is not so limited.

The system bus 518 may be any of several types of bus structures including a memory bus or memory controller, a peripheral bus, a switched fabric, point-to-point connections, and a local bus using any of a variety of bus architectures. The system memory 504 may also be referred to as simply the memory, and includes read only memory (ROM) 506 and random access memory (RAM) 505. A basic input/output system (BIOS) 508, containing the basic routines that help to transfer information between elements within the computer 500, such as during start-up, is stored in ROM 506. In an exemplary implementation, the jitter buffer may be implemented in a RAM 505 component of the memory. The computer 500 further includes a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM or other optical media.

The hard disk drive 530, magnetic disk drive 532, and optical disk drive 534 are connected to the system bus 518 by a hard disk drive interface 520, a magnetic disk drive interface 522, and an optical disk drive interface 524, respectively. The drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 530, magnetic disk 532, optical disk 534, ROM 506, or RAM 505, including an operating system 510, one or more application programs 512, other program modules 514, and program data 516. In an exemplary implementation, the heuristics module may be incorporated as part of the operating system 510, the application programs 512, or other program modules 514.

A user may enter commands and information into the personal computer 500 through input devices such as a keyboard 540 and pointing device 542, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 502 through a serial port interface 526 that is coupled to the system bus 518, but may be connected by other interfaces, such as a parallel port, game port, or a universal serial bus (USB).

A monitor 544 or other type of display device is also connected to the system bus 518 via an interface, such as a video adapter 546. In addition to the monitor 544, computers typically include other peripheral output devices, such as a printer 558 and speakers (not shown). These and other output devices are often connected to the processing unit 502 through the serial port interface 526 that is coupled to the system bus 518, but may be connected by other interfaces, such as a parallel port, game port, or a universal serial bus (USB). A media tuner module 560 may also be connected to the system bus 518 to tune audio and video programming (e.g., TV programming) for output through the video adapter 546 or other presentation output modules.

The computer 500 may operate in a networked environment using logical connections to one or more remote computers, such as remote computer 554. These logical connections may be achieved by a communication device coupled to or integral with the computer 500; the invention is not limited to a particular type of communications device. The remote computer 554 may be another computer, a server, a router, a network personal computer, a client, a peer device, or other common network node, and typically includes many or all of the elements described above relative to the computer 500, although only a memory storage device 556 has been illustrated in FIG. 5. The logical connections depicted in FIG. 5 include a local-area network (LAN) 550 and a wide-area network (WAN) 552. Such networking environments are commonplace in office networks, enterprise-wide computer networks, intranets and the Internet, which are all types of networks.

When used in a LAN 550 environment, the computer 500 may be connected to the local network 550 through a network interface or adapter 528, e.g., Ethernet or other communications interfaces. When used in a WAN 552 environment, the computer 500 typically includes a modem 548, a network adapter, or any other type of communications device for establishing communications over the wide area network 552. The modem 548, which may be internal or external, is connected to the system bus 518 via the serial port interface 526. In a networked environment, program modules depicted relative to the personal computer 500, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for dynamically improving responsiveness and robustness of media playback on a media player, the method comprising: receiving a media stream; configuring one or more storage parameters of a jitter buffer, the one or more storage parameters including at least one of a preroll duration value and a starvation threshold, the preroll duration value representing a minimum amount of first data from the media stream that is stored in the jitter buffer in order to play the media stream, the starvation threshold representing a minimum amount of second data from the media stream stored in the jitter buffer in order to prevent play-out of the second data in the jitter buffer; playing the media stream; monitoring a data storage state of the jitter buffer; and adjusting the one or more storage parameters of the jitter buffer based upon the data storage state.

2. The method of claim 1 further comprising gathering history data reflecting playback performance of the media stream relative to instantaneous jitter buffer characteristics; and adjusting the one or more storage parameters of the jitter buffer based upon the history data.

3. The method of claim 2 further comprising aggregating the history data corresponding to multiple media files in the media stream into a statistical compilation.

4. The method of claim 3 further comprising transmitting the statistical compilation over a network for storage at and use by one or more remote devices.

5. The method of claim 2 further comprising transmitting the history data over a network for aggregation into a statistical compilation at a remote device.

6. The method of claim 3 wherein the statistical compilation comprises a table of preroll duration values.

7. The method of claim 1, wherein the preroll duration value and the starvation threshold are respectively different for different types of media formats.

8. The method of claim 7 further comprising receiving at least one of the preroll duration value and the starvation threshold from a remote device via a network.

9. The method of claim 1, wherein the one or more storage parameters comprises an allocation of total jitter buffer size.

10. A computer readable storage device storing computer-executable instructions for performing a computer process implementing the method of claim 1.

11. The method of claim 1 further comprising requesting the one or more storage parameters for the jitter buffer before receiving the media stream in the jitter buffer, the one or more storage parameters being specific to the media stream.

* * * * *